United States Patent
Hearn

(10) Patent No.: US 6,498,407 B1
(45) Date of Patent: Dec. 24, 2002

(54) LOW SPEED MOVING MAGNET MOTOR HAVING A HIGH INERTIA ROTOR

(75) Inventor: Anthony R. Hearn, South Wonston (GB)

(73) Assignee: Xyratex Technology Limited, Hampshire (GB)

( * ) Notice: Subject to any disclaimer, the term of this patent is extended or adjusted under 35 U.S.C. 154(b) by 0 days.

(21) Appl. No.: 09/696,184

(22) Filed: Oct. 26, 2000

Related U.S. Application Data

(63) Continuation of application No. PCT/GB99/01318, filed on Apr. 28, 1999.

(30) Foreign Application Priority Data

May 1, 1998 (GB) ............................................... 9809436

(51) Int. Cl.[7] .......................... G11B 17/02; G11B 19/20; H02K 33/16
(52) U.S. Cl. ....................................................... 310/36
(58) Field of Search ............................. 310/12, 17, 36, 310/13, 156.25; 360/264.7, 264.8, 264.9, 265, 266.2, 266.4, 266.5, 266.6, 266.7, 266.8, 266.9

(56) References Cited

U.S. PATENT DOCUMENTS

| | | | |
|---|---|---|---|
| 4,510,403 A | | 4/1985 | Vanderlaan et al. ........... 310/36 |
| 4,620,252 A | * | 10/1986 | Bauck et al. ............. 310/36 X |
| 4,985,652 A | | 1/1991 | Oudet et al. .................. 310/15 |
| 5,579,188 A | | 11/1996 | Dunfield et al. .......... 310/90 X |
| 5,633,545 A | * | 5/1997 | Albrecht et al. .......... 310/67 R |
| 5,659,449 A | * | 8/1997 | Brook, Jr. et al. ........ 310/27 X |
| 5,668,679 A | * | 9/1997 | Swearingen et al. .......... 360/75 |
| 5,726,829 A | * | 3/1998 | Bodmer et al. .......... 360/99.08 |
| 6,215,616 B1 | * | 4/2001 | Phan et al. ............... 310/67 R |

FOREIGN PATENT DOCUMENTS

| | | |
|---|---|---|
| EP | 0 245 749 | 11/1987 |
| WO | WO 97/28596 | 8/1997 |

OTHER PUBLICATIONS

Patent Abstracts of Japan, vol. 017, No. 593 (E–1454), Oct. 28, 1993 & JP 05 176507 A (Sony Corp), Jul. 13, 1993.

* cited by examiner

Primary Examiner—Thomas M. Dougherty
Assistant Examiner—Judson H. Jones
(74) Attorney, Agent, or Firm—Pillsbury Winthrop LLP

(57) ABSTRACT

A low speed moving magnet motor (1) has a moving magnet (10) and a stationary coil (20) for carrying an electric current and disposed in relation to the moving magnet (10) such that a magnetic field generated when a current flows through the coil (20) causes the moving magnet (10) to move relative to the coil. A magnetic return path member (15) is fixed in relation to the coil (20) to provide a return path for a magnetic field generated by the coil (20) and the moving magnet (10). In an example, the magnetic return path member (15) is free of insulating laminations. The moving magnet (10) is mounted on a rotor (6) of the motor (1) which has a high inertia.

23 Claims, 2 Drawing Sheets

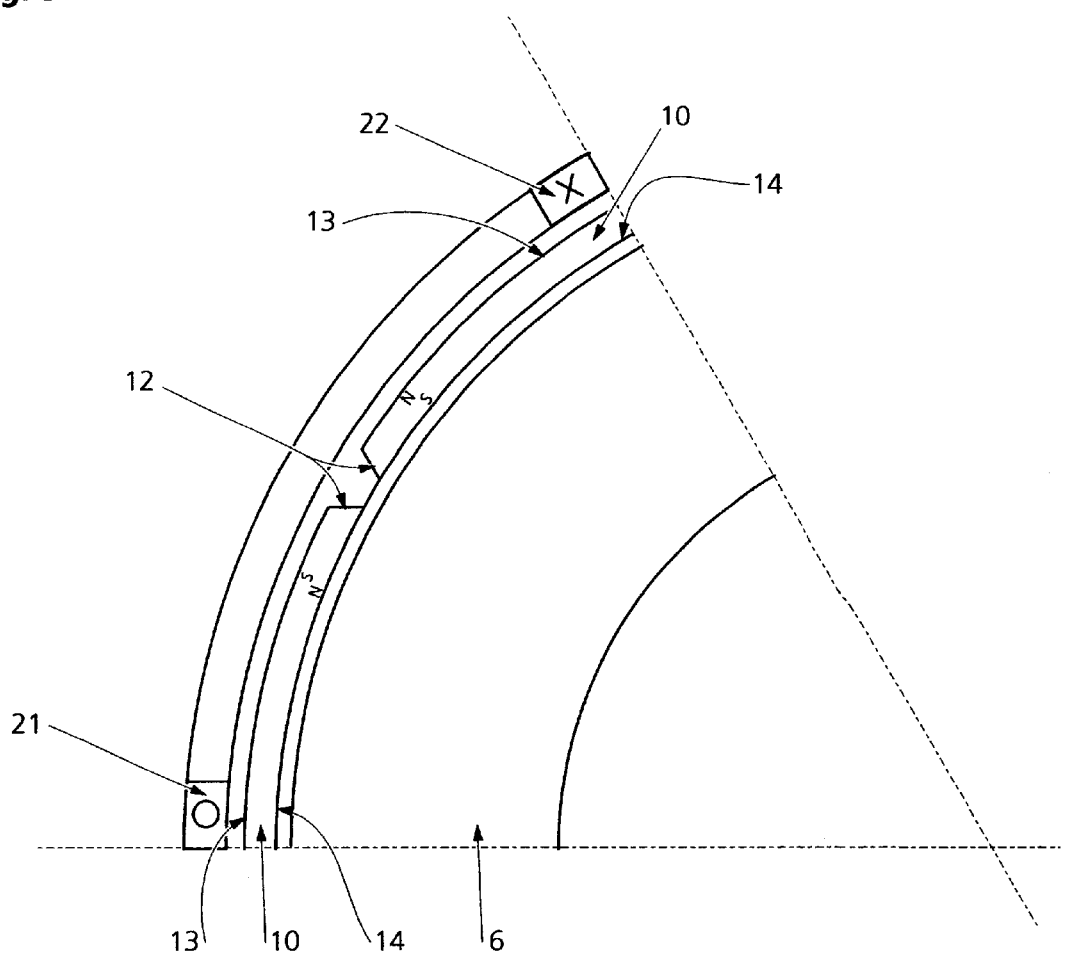

LOW SPEED MOVING MAGNET MOTOR HAVING A HIGH INERTIA ROTOR

This is a continuation of application Ser. No. PCT/GB99/01318, filed Apr. 28, 1999.

The present invention relates to a moving magnet motor and a method of operating a moving magnet motor. The present invention has particular applicability to a low speed moving magnet motor, for example a servowriter positioner motor.

In a storage medium in which data is read from and/or written to the medium by a read/write head which is movable relative to the storage medium, movement of the read/write head is usually controlled by a servo system. The servo system uses servo information which is prerecorded on the storage medium. By reading this servo information, the actual position of the read/write head relative to the storage medium can be determined and control signals sent to move the head accordingly.

In a head disk assembly, the storage medium is a magnetic "hard" disk and the read/write head or heads are mounted for movement over the disk surface by an arm which is often known as the "product arm".

A servowriter is used to write the servo information to the disk, The servowriter has its own dedicated clock head. The servowriter clock head is offered up to the disk and used firstly to write a (usually temporary) clock track on the disk to provide a series of clock transitions indicating angular position around the disk. The servowriter has a positioner arm which is linked to the product arm such that movement of the positioner arm causes a corresponding movement of the product arm. Movement of the servowriter positioner arm is controlled very precisely by an angular detection system in the servowriter. The angular detection system may be a laser reflecting light from a very fine graticule on the positioner arm for example. After the clock track has been written, the clock transitions are read with the servowriter clock head so that the angular position of the disk relative to the servowriter is accurately known at all times. The positioner arm is moved to preselected angular positions by a positioner motor of the servowriter. The product arm moves with the positioner arm and the product read/write head is used to write the servo tracks at the required preselected angular positions on the disk.

It is important that the servo tracks be written as quickly as possible so as to achieve faster throughput of the hard disks during manufacture, especially as servowriting is typically carried out in a clean room where space is limited and expensive. It is therefore important for a servowriter to achieve quick track seek (i.e. fast movement of the head between tracks on the storage medium) and quick track settle (i.e. the head should come to rest quickly once in position over the desired track).

Conventional practice has been to mechanically link the servowriter positioner arm with the product arm so that movement of the positioner arm automatically brings about a corresponding movement of the product arm. However, this mechanical linkage between the positioner arm and the product arm increases the effective inertia of the servowriter positioner which controls movement of the positioner arm. Moreover, the positioner arm is usually connected only to the lowermost product arm of a stack of product arms. The product arms above the lowermost arm are effectively a resonant body which, because they are mechanically linked to the positioner arm, can lead to unexpected and undesired resonances. Such resonances are difficult to predict throughout the range of movement of the positioner arm and the mechanical link slows movement of the servowriter positioner arm and the product arms. More importantly in a servowriter, the resonances tend to be lower in frequency than they would be in an operational disk drive. This reduces the bandwidth of the servo which is used to control the position of the product arm during servowriting, resulting in a worsening of the seek/settle time and an increase in the track-to-track spacing. One known way of overcoming this problem is to drive the product arm via its own drive mechanism during the servowriting process and disconnect the mechanical linkage between the product arm and the positioner arm. The relative motion between the product arm and the positioner arm can be detected by a null sensor the output of which is used to control the drive current provided to the product arm drive mechanism via a separate servo so as to move the product arm in tandem with the positioner arm during servowriting. The use of this null sensor and separate servo for moving the product arm also improves the positioner servo bandwidth and therefore the seek/settle time of the positioner.

At least some prior art servowriter positioner motors for moving the positioner arm have been of the moving coil type. As such, flexible supply cables have to be connected to the moving coils of the positioner motor. These flexible cables provide an undesirable bias to the positioner arm which therefore affects movement of the positioner arm.

U.S. Pat. No. 4,775,908 discloses a moving magnet motor for moving a product arm of a hard disk drive. As the product arm must move very quickly between tracks in order to provide fast disk access times, the motor of each of the examples described in the patent specification must be a high speed motor. In one particular example described in the patent specification, the magnetic return path member moves with the moving magnet so no eddy currents are produced. In another particular example described in the patent specification and in a prior art example described as "largely hypothetical" in the patent specification, the magnetic return path member is stationary relative to the moving magnet; in this second example and the hypothetical prior art, whilst it is not specifically shown nor described, the magnetic return path member must be laminated as otherwise the eddy currents which would be produced because of the high speed of relative movement between the magnet and the magnetic return path member would inhibit movement of the product arm such that the product arm could not be moved satisfactorily.

According to a first aspect of the present invention, there is provided a low speed moving magnet motor, the motor comprising: a moving magnet; a stationary coil for carrying an electric current and disposed in relation to the moving magnet such that a magnetic field generated when, a current flows through the coil causes the moving magnet to move relative to the coil; and, a magnetic return path member fixed in relation to the coil to provide a return path for a magnetic field generated by the coil and the moving magnet; the magnetic return path member being free of insulating laminations.

With a moving magnet motor having a fixed magnetic return path member, movement of the magnet relative to the magnetic return path member generates large eddy currents in the magnetic return path member. These large eddy currents provide a bias which tends to act against movement of the moving magnet. Accordingly, it is normal practice in a moving magnet motor to laminate the magnetic return path member with layers of non-conductive material in order to reduce the magnitude of the eddy currents. Having a laminated magnetic return path member inevitably increases the cost of the motor as a whole and can in fact be a significant part of the total cost of the moving magnet motor. In accordance with this aspect of the present invention, where the moving magnet motor is a low speed motor, it has been found that the eddy currents produced are of such a low magnitude that it is not necessary to laminate the magnetic return path member with insulating material. Such a motor has particular application as a servowriter positioner motor for moving a servowriter positioner arm. Thus, this aspect of the present invention provides a moving magnet motor, thereby avoiding the need for flexible cable connection to what would otherwise be moving coils of the motor, whilst keeping down the cost of the motor by having an unlaminated magnetic return path member.

The magnetic return path member is preferably pure magnetically soft iron.

The moving magnet is preferably carried by a rotor which is mounted for pivotable movement about a longitudinal axis of the motor. The rotor is preferably annular and arranged to pivot about its central longitudinal axis. Such a rotor can have a high moment of inertia, the advantages of which are discussed further below especially in relation to a servowriter. The rotor may be stainless steel or pure magnetically soft iron, for example.

According to a second aspect of the present invention, there is provided a moving magnet motor, the motor comprising: a high inertia rotor movable about a longitudinal axis of the motor; a moving magnet carried by the rotor for movement therewith; a stationary coil for carrying an electric current and disposed in relation to the moving magnet such that a magnetic field generated when a current flows through the coil causes the moving magnet to pivot about said axis; and, a magnetic return path member fixed in relation to the coil to provide a return path for a magnetic field generated by the coil and the moving magnet.

The provision of a high inertia rotor has numerous advantages, especially when the motor is used to move a servowriter positioner arm. In particular, a high inertia rotor is resistant to shock forces or turbulence arising through buffeting caused by air flow as the servowriter head moves over the storage medium, thereby removing or at least reducing one source of vibration of the servowriter head.

Furthermore, bearings for the moving parts of the motor are in practice axially preloaded to take up any play in the bearings. This preload causes a rolling friction in the bearings which acts against the direction in-which rolling takes place. When changing direction, the friction force changes direction but the change is not instantaneous and in fact has a defined slope which manifests itself as a stiffness. In other words, the bearings appear to have a torsional stiffness. This torsional stiffness combines with the inertia of the motor to result in a resonant frequency for movement of the motor which is proportional to the square root of the bearing stiffness and inversely proportional to the square root of the motor inertia. Thus, a high inertia for the motor reduces the frequency of this low frequency resonance. In servo control, it is important to keep this low frequency resonant pole well below the servo bandwidth in order to improve the predictability of the servo during seek and this can be achieved more easily with a high inertia motor. If a low inertia motor were used, either a much smaller bearing with a lower stiffness or an expensive air bearing having very low stiffness would have to be used, either of which makes the motor more expensive and difficult to manufacture.

A high inertia motor is particularly important in a servowriter where there is no mechanical link between the positioner arm and the product arm during the servowriting process.

The magnetic return path member is preferably pure magnetically soft iron.

The rotor may be stainless steel or pure magnetically soft iron, for example.

The rotor is preferably annular in cross-section transverse to said axis.

In each aspect where a rotor is provided, the rotor is preferably mounted on a stationary spindle by a bearing for movement about the stationary spindle. The bearing may include at least one ball bearing.

In each aspect where a rotor is provided, a plurality of magnets may be carried by the rotor. A plurality of coils corresponding to the plurality of magnets may be provided.

In each aspect of the invention, the moving magnet is preferably mounted so as to pivot about an axis when a current flows through the coil and the magnetic return path member is preferably arcuate to maintain a substantially constant separation between the moving magnet and the magnetic return path member as the moving magnet pivots about said axis. The magnetic return path member is preferably annular.

According to another aspect of the present invention, there is provided a positioner motor for drivingly moving a positioner arm of a servowriter, the motor being as described above.

According to another aspect of the present invention, there is provided a servowriter for writing servo information to a storage medium which in use is read by a read/write head mounted on a product arm of the storage medium, the servowriter comprising: a positioner arm for positioning over said storage medium and causing a corresponding movement of a product arm of the storage medium; and, a motor as described above which is drivable to move the servowriter positioner arm relative to the storage medium.

The moving magnet is preferably carried by a hollow rotor which is mounted for pivotable movement about a bearing positioned within the hollow centre of the rotor, the positioner arm being connected to the rotor for movement therewith. Because the rotor has a diameter which is relatively large (compared to the narrow output shafts of typical prior art torque motors), the torsional stiffness of the rotor is relatively high. This results in a high resonant frequency and thus improved servo bandwidth, thereby reducing the seek/settle time of the positioner arm/product arm combination and allowing the track-to-track spacing to be decreased.

The servowriter may include means for mechanically linking the positioner arm to a product arm of a storage medium. However, the servowriter preferably includes means for moving a product arm of a storage medium by a non-contact method.

According to a further aspect of the present invention, there is provided a method of operating a moving magnet motor which comprises a moving magnet carried by a rotor which is mounted for movement about a longitudinal axis of the motor, a stationary coil for carrying an electric current, and an unlaminated magnetic return path member fixed in relation to the coil to provide a return path for a magnetic field generated by the coil and the moving magnet, the method comprising the steps of providing an electric current to the coil so that the rotor and the magnet move with an angular speed equal to or less than about 0.5 radians per second about said axis.

The motor may be operated so that the rotor and the magnet move with an angular speed equal to or less than about 0.1 radians per second about said axis.

According to a yet further aspect of the present invention, there is provided a method of operating a servowriter to write servo information to a storage medium which in use is read by a read/write head mounted on a product arm of the storage medium, the servowriter comprising: a positioner arm for positioning over the storage medium and causing a corresponding movement of the product arm of the storage medium; and, a motor to which the positioner arm is connected for moving the positioner arm and which comprises a moving magnet carried by a rotor which is mounted for movement about a longitudinal axis of the motor; a stationary coil for carrying an electric current; and, an unlaminated magnetic return path member fixed in relation to the coil to provide a return path for a magnetic field generated by the coil and the moving magnet; the method comprising the steps of: providing an electric current to the coil so that the positioner arm moves with an angular speed of less than about 0.5 radians per second about said axis.

The motor may be operated so that the positioner arm moves with an angular speed equal to or less than about 0.1 radians per second about said axis.

The rotor is preferably hollow and mounted for movement about a bearing positioned within the hollow centre of the rotor, the positioner arm being connected to the rotor for movement therewith.

Thus, in its most preferred embodiment, the present invention provides a moving magnet motor which has an unlaminated magnetic return path member, thereby keeping down the cost of the motor. The preferred embodiment of the motor has a high inertia rotor which lowers the frequency of the low-frequency pole of the bearing in which the rotor is mounted which improves the settle characteristics of the motor. A high inertia rotor also reduces vibration caused through air buffeting where the motor is used to drive a servowriter positioner arm for example. In a servowriter, the servowriter positioner arm can be connected to the rotor with the rotor having a high torsional stiffness, thereby improving the servo bandwidth and therefore the seek/settle time and track-to-track spacing. Having a stationary coil obviates the need for flexible cables to provide the power supply to what would otherwise be moving coils, thereby eliminating the bias typically associated with connection of flexible cables to the moving coils of the prior art motors. Thus, the hysteresis problems which can arise because of the use of flexible cables in such prior art motors are avoided.

Whilst the motor as described above has particular application in a servowriter for moving a positioner arm, it will be appreciated that the motor can be used in any application where high positioning accuracy, particularly high rotary positioning accuracy, is required with a low speed of movement. Thus, for example, such a motor would not normally be useful for moving the product head of a head disk assembly in normal use as very rapid movement of the product head is required to provide fast disk access times in normal operational use.

An embodiment of the present invention will now be described by way of example with reference to the accompanying drawings, in which:

FIG. 3 is a plan view of a portion of the motor of FIGS. 1 and 2 showing the orientation of the coils and magnets and the magnetic field in more detail.

Figure 1:
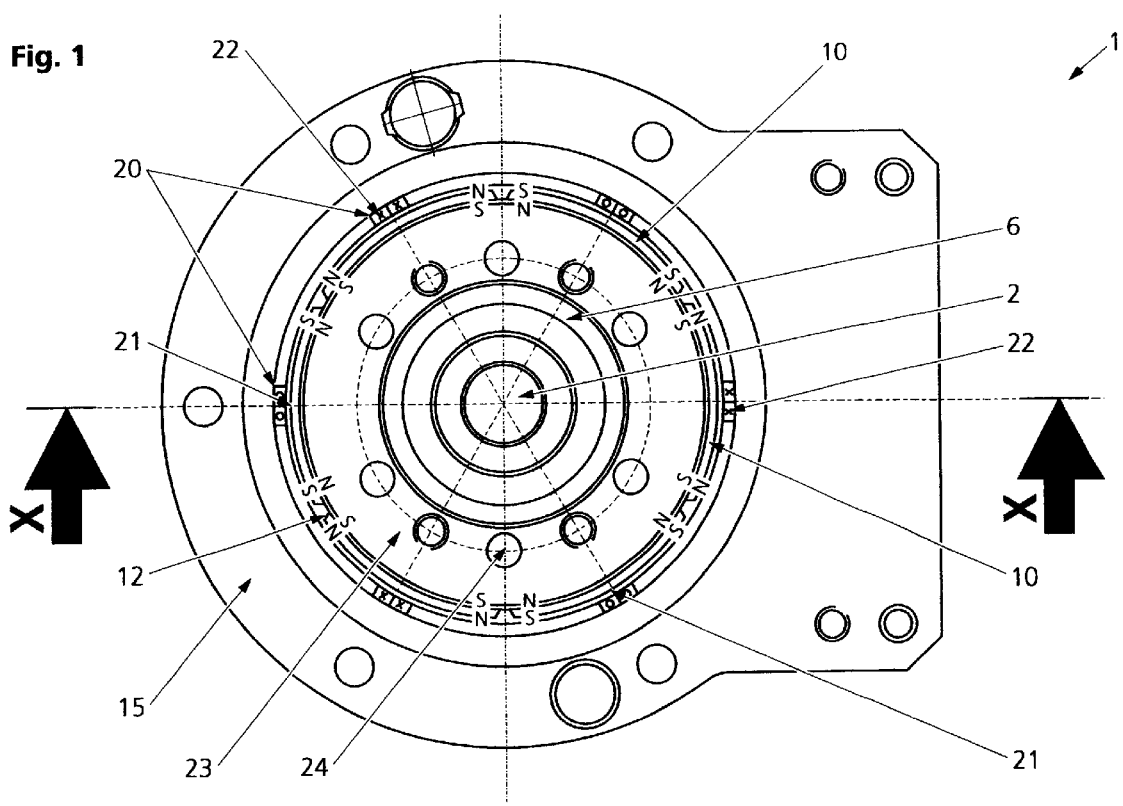
FIG. 1 is a plan view from above of a motor in accordance with the present invention.
Figure 2:
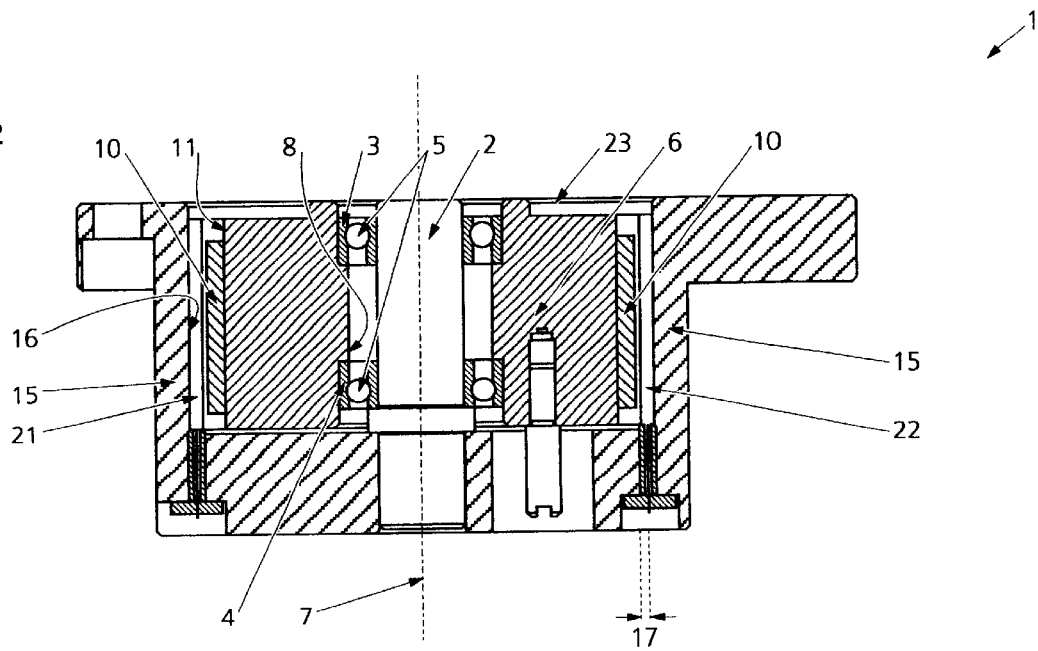
FIG. 2 is a cross-sectional view on X—X of FIG. 1.

Referring to the drawings, there is shown a moving magnet motor 1. The motor 1 has a central stationary spindle 2 to which are fitted upper and lower ball bearings 3,4 each of which has a plurality of balls 5.

A rotor 6 is fixed to the bearings 3,4 so as to be able to rotate or pivot around the spindle 2. As shown, the rotor 6 is a hollow right cylinder having an annular cross-sectional shape transverse to the longitudinal axis 7 of the motor 1. The spindle 2 and bearings 3,4 are located within the hollow centre of the rotor 6, preferably centrally of the rotor 6. The rotor 6 is made of a magnetically soft material such as a low carbon mild steel or pure magnetically soft iron. Because of its annular shape, and because of the relatively dense material from which it can be made, and because the rotor 6 does not have any weight-reducing holes or voids typically found in rotors of other comparable motors, the rotor 6 has a high moment of inertia about the longitudinal axis 7 of the is motor 1. The moment of inertia of the rotor 6 may be of the order of 70 kg.mm$^2$. The bearings 3,4 connect to the inner cylindrical surface 8 of the rotor 6.

Six permanent magnets 10 are fixed to the outer cylindrical surface 11 of the rotor 6. Each permanent magnet 10 is arcuate in cross-section and subtends an angle of 60° at the central axis 7 of the motor 1 such that the magnets 10 completely fill the outermost periphery of the rotor 6 when viewed from above as shown in FIG. 1. The adjacent edges 12 of the permanent magnets 10 are bevelled away from each other on moving radially outwards of the rotor 6 as shown particularly clearly in FIG. 3.

Each of the permanent magnets 10 is magnetised in a radial direction of the motor 1. The polarity of the magnetisation alternates between adjacent magnets 10. Thus, as shown particularly clearly in FIG. 3, one permanent magnet 10 has a north pole on its radially outermost face 13 and a south pole on its radially innermost face 14. The adjacent permanent magnets 10 on either side have a south pole on their respective outer faces 13 and a north pole on their respective inner faces 14.

A hollow generally cylindrical magnetic return path member 15 surrounds the rotor 6 and the permanent magnets 10. The inner cylindrical surface 16 of the magnetic return path member 15 is spaced from the permanent magnets 10 by an annular gap 17. The annular gap 17 should be as narrow as possible and ideally would not be present at all as it tends to reduce the magnetic flux density. The magnetic return path member 15 may be made of stainless steel or pure magnetically soft iron, for example, and provides a path of high magnetic permeability for the magnetic flux generated by the permanent magnets 10. The magnetic return path member 15 is not laminated with any non-conductive material and indeed is preferably homogeneous. The spindle 2 also provides a flux path for the magnets 10.

Six current-carrying coils 20 are located in the annular gap 17 between the magnetic return path member 15 and the permanent magnets 10. Each coil 20 has spatially separated limbs 21, 22 which subtend an angle of 60° at the central longitudinal axis 7 of the motor 1. The six coils 20 are adjacent each other. As shown in FIG. 1 and more clearly in FIG. 3, electric current in use passes up one limb 21 of the coil 20 (as shown by a small circle in the drawings) and down the other limb 22 of that coil 20 (as shown by a small cross in the drawings). The six coils 20 are connected in series such that the same current flows through each of the coils 20. Moreover, the connection between the six coils 20 is such that the current flow through pairs of neighbouring limbs 21 or 22 of adjacent coils 20 is in the same direction as indicated in FIGS. 1 and 3.

A disc-like cover plate 23 is fixed to the top of the rotor 6 and moves with the rotor 6 when the coils 20 are energised. The cover plate 23 has six screw holes 24. Where the motor 1 is a positioner motor for moving the positioner arm of a servowriter, the positioner arm can be coupled to the cover plate 23 by means of the screw holes 24. Thus, when the coils 20 are appropriately energised and the rotor 6 pivots about the axis 7, the positioner arm is caused to pivot with the movement of the rotor 6.

The motor 1 of the present invention has numerous advantages. Because the coils 20 are fixed, it is not necessary to provide flexible power supply cables to the coils 20 and thus no unwanted bias to movement of the rotor 6 occurs. Where the motor 1 is used in a servowriter to move the positioner arm, the reduced bias on the rotor 6 facilitates control of and improves the speed of track-to-track seek and settle.

Despite the permanent magnets 10 moving relative to the magnetic return path member 15, eddy currents which arise in the magnetic return path member 15 are not a problem where the motor 1 is used for low speed movement of the rotor 6. In a servowriter for example, the rotor need only move with an angular speed of less than or equal to about 0.5 radians per second or even less than or equal to about 0.1 radians per second. Where the motor 1 is used to move at such relatively low speeds with the resultant small eddy currents, the magnetic return path member 15 does not have to be laminated with insulation material, which keeps down the cost of the motor 1. Indeed, in a servowriter, small eddy currents in the magnetic return path member 15 can be advantageous in that they produce a small damping force which tends to cause the servowriter positioner arm to settle more rapidly once the desired track has been located.

The rotor 6 has a high moment of inertia. Where the motor 1 is used to move a servowriter positioner arm, a high inertia rotor 6 has several advantages. In particular, vibration of the servowriter positioner arm because of air buffeting during movement of the positioner arm is reduced. A high inertia rotor allows the use of low cost ball bearings 3,4 for mounting the rotor 6 on the spindle 2 by lowering the frequency of the low frequency pole of the combination of friction of the bearings 3,4 and the inertia of the motor, which allows more rapid and more easily controllable track-to-track seek and settle in a servowriter. Ball bearings are much cheaper than air or liquid bearings which have been used in the past. The spindle 2 about which the rotor 6 rotates has a narrow diameter. A narrow diameter spindle 2 allows the use of bearings 3,4 which are small which reduces the friction arising in the bearings 3,4, again improving the operational characteristics of the motor 1 and particularly reducing the settle time of the rotor 6 and a positioner arm and head affixed to the rotor 6. Because the rotor 6 itself has a relatively large diameter (compared to the narrow output shafts of typical prior art torque motors), the torsional stiffness of the rotor 6 is relatively high. This results in a high resonant frequency and thus improved servo bandwidth, thereby reducing the seek/settle time of the positioner arm/product arm combination and allowing the track-to-track spacing achievable with the servowriter to be decreased.

A servowriter positioner arm affixed to the rotor 6 can be balanced. This allows rocking mode resonances to be eliminated and a balanced torque is provided by the rotor 6. Torque is transmitted directly to the servowriter positioner arm from the rotor 6 which results in a high torsional resonant frequency. The motor 1 can be very compact and small, allowing it to be fitted into the footprint presently provided in conventional servowriters for the positioner motor.

An embodiment of the present invention has been described with particular to the example illustrated. However, it will be appreciated that variations and modifications may be made to the example described within the scope of the present invention.

What is claimed is:

1. A low speed moving magnet motor, the motor comprising:
   an even number of moving magnets symmetrically disposed about a pivot axis of the motor, each of said moving magnets being arranged to provide a radial magnetic field;
   an even number of stationary coils symmetrically disposed about said pivot axis for carrying an electric current and disposed in relation to the moving magnets such that a magnetic field generated when a current flows through the coils causes the moving magnets to move relative to the coils about said pivot axis; and
   a magnetic return path member fixed in relation to the coils to provide a return path for a magnetic field generated by the coils and the moving magnets;
   the magnetic return path member being free of insulating laminations.

2. A motor according to claim 1, wherein the moving magnets are carried by a rotor which is mounted for pivotable movement about said pivot axis of the motor.

3. A motor according to claim 2, wherein the rotor is annular and is arranged to pivot about its central longitudinal axis.

4. A motor according to claim 3, wherein the rotor is mounted on a stationary spindle by a bearing for movement about the stationary spindle.

5. A motor according to claim 4, wherein the bearing includes at least one ball bearing.

6. A motor according to claim 1, wherein the magnetic return path member is arcuate to maintain a substantially constant separation between the moving magnets and the magnetic return path member as the moving magnets pivot about said pivot axis.

7. A servowriter for writing servo information to a storage medium which in use is read by a read/write head mounted on a product arm of the storage medium, the servowriter comprising:
   a positioner arm for positioning over said storage medium and causing a corresponding movement of a product arm of the storage medium; and
   a motor according to claim 1, which is drivable to move the servowriter positioner arm relative to the storage medium.

8. A servowriter according to claim 7, wherein the moving magnet is carried by a hollow rotor which is mounted for pivotable movement about a bearing positioned within the hollow centre of the rotor, the positioner arm being connected to the rotor for movement therewith.

9. A servowriter according to claim 7, comprising means for mechanically linking the positioner arm to a product arm of a storage medium.

10. A servowriter according to claim 7, comprising means for moving a product arm of a storage medium by a non-contact method.

11. A moving magnet motor, the motor comprising:
    a high inertia rotor movable about a longitudinal axis of the motor;
    an even number of moving magnets carried by the rotor for movement therewith, the moving magnets being symmetrically disposed about the longitudinal axis of the motor, each of said moving magnets being arranged to provide a radial magnetic field;
    an even number of stationary coils symmetrically disposed about the longitudinal axis of the motor for carrying an electric current and disposed in relation to the moving magnets such that a magnetic field generated when a current flows through the coils causes the moving magnets to pivot about said axis; and a magnetic return path member fixed in relation to the coils to provide a return path for a magnetic field generated by the coils and the moving magnets.

12. A motor according to claim 11, wherein the rotor is annular in cross-section transverse to said axis.

13. A motor according to claim 12, wherein the rotor is mounted on a stationary spindle by a bearing for movement about the stationary spindle.

14. A motor according to claim 13, wherein the bearing includes at least one ball bearing.

15. A motor according to claim 11, wherein the magnetic return path member is arcuate to maintain a substantially constant separation between the moving magnets and the magnetic return path member as the moving magnets pivot about said axis.

16. A motor according to claim 15, wherein the magnetic return path member is annular.

17. A servowriter for writing servo information to a storage medium which in use is read by a read/write head mounted on a product arm of the storage medium, the servowriter comprising:

a positioner arm for positioning over a storage medium and causing a corresponding movement of a product arm of the storage medium; and a motor according to claim 11, which is drivable to move the servowriter positioner arm relative to the storage medium.

18. A method of operating a moving magnet motor which comprises a moving magnet carried by a rotor which is mounted for movement about a longitudinal axis of the motor, a stationary coil for carrying an electric current, and an unlaminated magnetic return path member fixed in relation to the coil to provide a return path for a magnetic field generated by the coil and the moving magnet, the method comprising the steps of providing an electric current to the coil so that the rotor and the magnet move with an angular speed of less than about 0.5 radians per second about said axis.

19. A method according to claim 18, wherein the motor is operated so that the rotor and the magnet move with an angular speed equal to or less than about 0.1 radians per second about said axis.

20. A method of operating a servowriter to write servo information to a storage medium which in use is read by a read/write head mounted on a product arm of the storage medium, the servowriter comprising: a positioner arm for positioning over the storage medium and causing a corresponding movement of the product arm of the storage medium; and a motor to which the positioner arm is connected for moving the positioner arm and which comprises a moving magnet carried by a rotor which is mounted for movement about a longitudinal axis of the motor; a stationary coil for carrying an electric current; and an unlaminated magnetic return path member fixed in relation to the coil to provide a return path for a magnetic field generated by the coil and the moving magnet; the method comprising the steps of: providing an electric current to the coil so that the positioner arm moves with an angular speed of less than about 0.5 radians per second about said axis.

21. A method according to claim 20, wherein the rotor is hollow and is mounted for movement about a bearing positioned within the hollow centre of the rotor, the positioner arm being connected to the rotor for movement therewith.

22. A method according to claim 20, wherein the motor is operated so that the positioner arm moves with an angular speed equal to or less than about 0.1 radians per second about said axis.

23. A servowriter for writing servo information to a storage medium which in use is read by a read/write head mounted on a product arm of the storage medium, the servowriter comprising:

a positioner arm for positioning over a storage medium and causing a corresponding movement of a product arm of the storage medium; and a motor which is drivable to move the servowriter positioner arm relative to the storage medium, the motor comprising:

a moving magnet;

a stationary coil for carrying an electric current and disposed in relation to the moving magnet such that a magnetic field generated when a current flows through the coil causes the moving magnet to move relative to the coil; and a magnetic return path member fixed in relation to the coil to provide a return path for a magnetic field generated by the coil and the moving magnet;

the magnetic return path member being free of insulating laminations;

the moving magnet being carried by a hollow rotor which is mounted for pivotable movement about a bearing positioned within the hollow centre of the rotor, the positioner arm being connected to the rotor for movement therewith.

* * * * *